March 11, 1969
C. J. GREEN
3,431,743
GENERATION OF COOL WORKING FLUIDS
Filed Nov. 7, 1967
Sheet 1 of 3
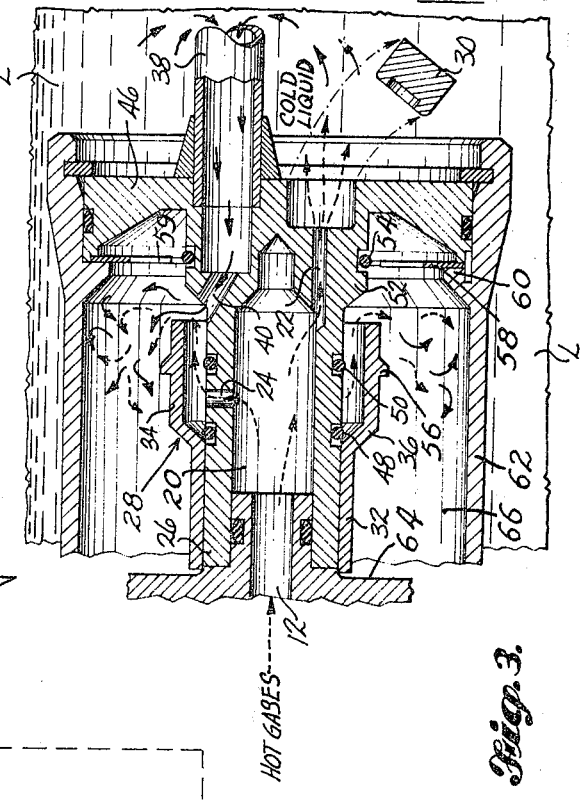
INVENTOR
CHARLES J. GREEN
BY Graybeal, Cole & Barnard
ATTORNEY

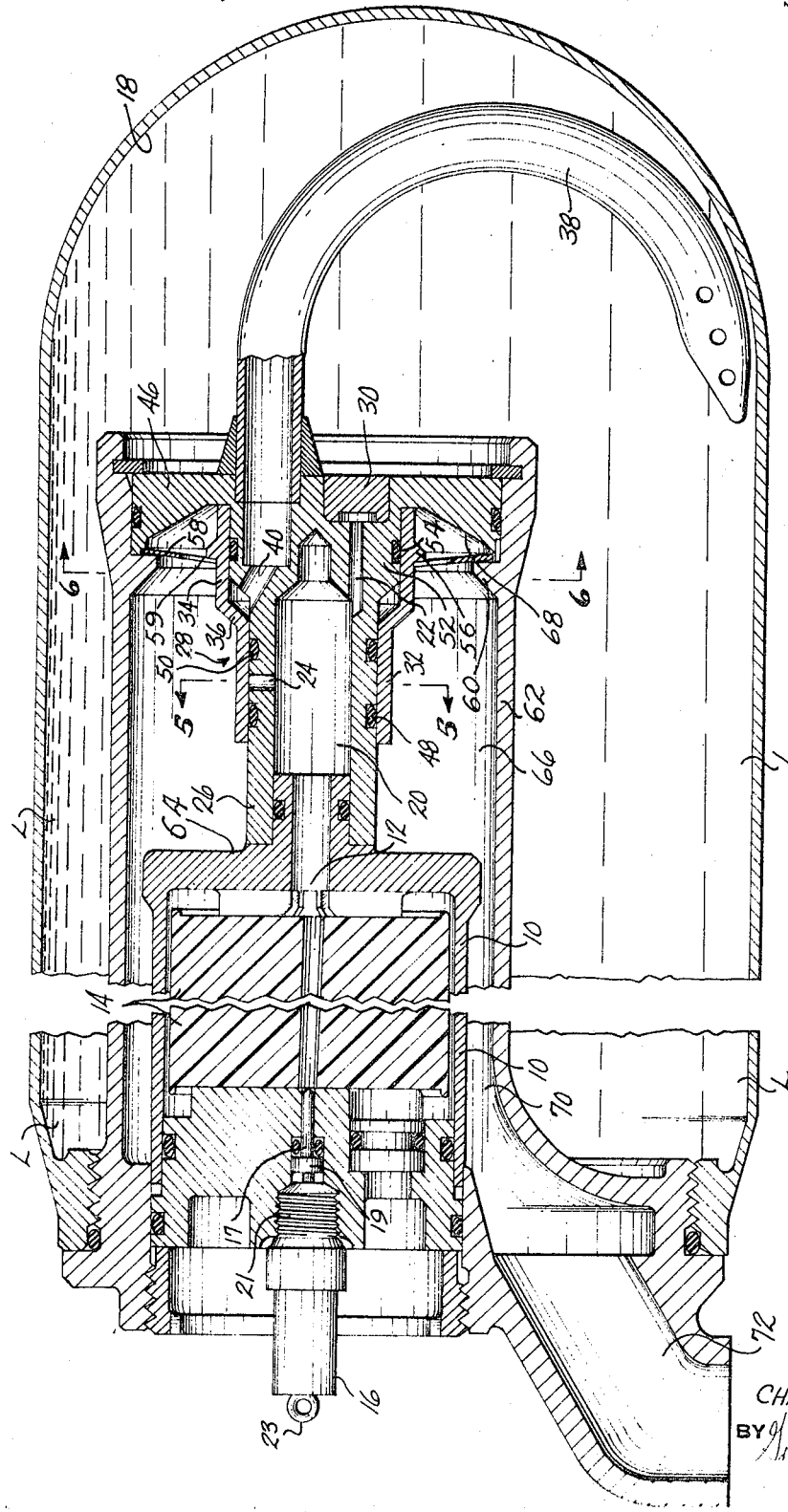

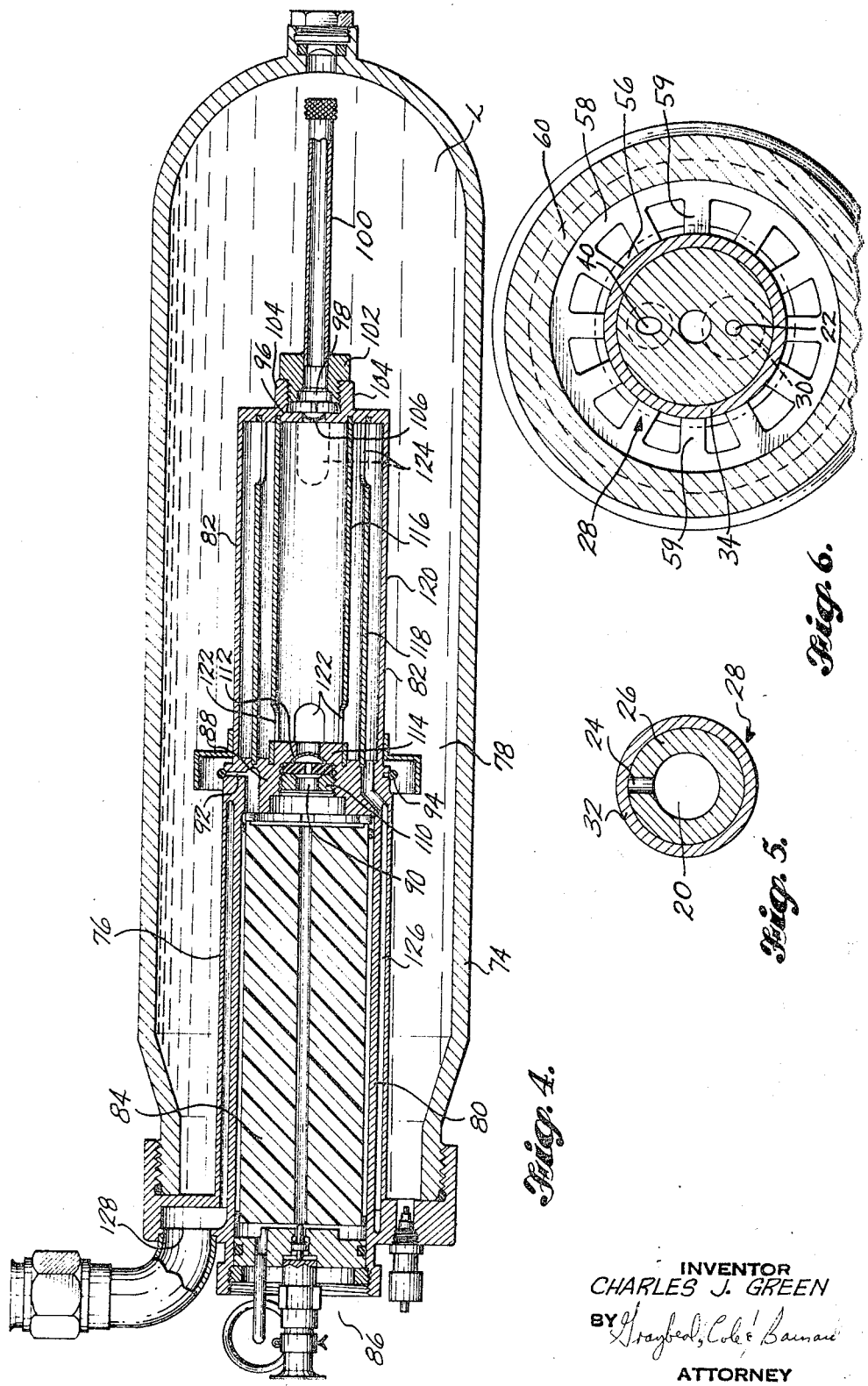

United States Patent Office 3,431,743
Patented Mar. 11, 1969

3,431,743
GENERATION OF COOL WORKING FLUIDS
Charles J. Green, Vashion Island, Wash., assignor to Rocket Research Corporation, Seattle, Wash., a corporation of Washington
Continuation-in-part of application Ser. No. 608,152, Jan. 9, 1967. This application Nov. 7, 1967, Ser. No. 682,730
U.S. Cl. 62—52    19 Claims
Int. Cl. F17c 9/02, 7/02

ABSTRACT OF THE DISCLOSURE

Generating hot gases under pressure, using a portion of such gases to pressure feed a liquid from its storage chamber to a mixing chamber, directing the remainder of the hot gases into counterflowing mixing contact with the liquid substantially as they both enter the mixing chamber, delaying the hot gases and liquid in the mixing chamber long enough for the hot gases to provide the heat of vaporization for, and cause the vaporization of, the liquid. A sleeve valve member initially closing the passageway leading from the hot gas generator to the mixing chamber, such valve member including a piston portion subjected to the first flow of cold liquid from the storage chamber, with such liquid opening the sleeve valve.

CROSS REFERENCE TO RELATED APPLICATIONS

This application is a continuation-in-part of my copending application Ser. No. 608,152, filed Jan. 9, 1967, and entitled Generation of Cool Working Fluids.

BACKGROUND OF THE INVENTION

*Field of the invention*

The present invention relates primarily to the generation of a relatively low temperature working fluid or gaseous mixture under pressure. It relates more to the handling and combining of the substances which produce the working fluid than to the dispensing of the working fluid after it has been generated. The cool gas generating procedure involves the generation of hot gases, the pumping of a liquid coolant, which is preferably a liquefied gas, by means of the hot gases, and the mixing of said liquid and said hot gases to cause vaporization of the liquid, by means of heat furnished by the hot gases. The mixing is characterized primarily by an introduction of the two fluids into the mixing chamber in a counterflowing direct contact fashion.

DESCRIPTION OF THE PRIOR ART

Known gas generators which involve mixing combustion products and a coolant are disclosed by Goddard 2,522,113; Scholz 2,530,633; Maurice 2,779,281; Volk, 2,994,194 and also by Hebenstreit 3,117,424; Hebenstreit et al. 3,122,181; Hebenstreit 3,143,445; Wismar 3,-163,014; Hebenstreit 3,180,373; Hebenstreit 3,232,481; and Wismar 3,269,310. Each of this latter group of patents involves a system wherein the combustion products and the liquefied gas are mixed together in the storage chamber for the liquefied gas, and the resulting mixture, which is gaseous, is then released or withdrawn from such storage chamber.

Wismar 3,163,014 discloses a process comprising: generating hot combustion gases and initially directing all of such gases into a chamber confining liquefied carbon dioxide. Such chamber is initially closed by a blowout element. When the pressure in said container exceeds the burst pressure of the blowout element, such element is ruptured, and the outlet is opened. The remaining combustion gases then serve to aspirate the mixture of gases from the carbon dioxide storage chamber.

Hebenstreit et al. 3,122,181 discloses entraining ambient air in a working fluid constituting a mixture of combustion gases and carbon dioxide, and then introducing the final mixture into an inflatable device.

SUMMARY OF THE INVENTION

The subject invention relates to a method and apparatus for rapidly pumping a cold fluid, such as a liquid refrigerant, from its storage chamber, and then rapidly vaporizing such liquid by thoroughly mixing it with hot gases from a hot gas generator, to provide a relatively cool gaseous working fluid, and particularly such a fluid that is suitable for use in inflating inflatable structures such as aircraft escape slides, for example.

The basic technique of the invention forming the subject matter of my aforementioned parent application Ser. No. 608,152 comprises concurrently generating hot gases under pressure, such as by burning a fuel, in a first confined zone; introducing at least a portion of the hot gases into a second confined zone constituting the detaining and mixing chamber delivering a cold liquid from a third confined zone constituting the storage chamber for the liquid; delaying both fluids in the mixing chamber a sufficient time to allow the hot gases to provide the heat of vaporization for, and cause the vaporization of, at least most of the liquid; and then delivering the cool gas effluent of the detaining and mixing chamber to a utilization device. The technique of the present invention involves the same basic steps. However, the hot gases and the liquid are impinged together as they are introduced into the mixing chamber, for the purpose of enhancing their mixing.

My prior application Ser. No. 608,152 discloses using a portion of the hot gases to pressure feed the liquid, and fully discusses the relationship of the generation rate of the hot gases to the pumping rate of the cold liquid, and various ways of controlling the hot gas generation rate. In like fashion, in the system of the present invention the flow rate of the cold liquid may be closely dependent on, and determinable by, the flow rate of the hot gases from the hot gas generator. In the preferred embodiment any change in the flow rate of the hot gases, caused by a change in the generation rate of such hot gases, for example, causes a proportional change in the flow rate of the cold liquid, which change is relatively accurately predictable. My application Ser. No. 608,152 discloses generating hot gases by burning a solid fuel grain in a confined chamber, and preshaping the fuel grain in various ways to establish particular burning surface patterns, so as to in that manner establish the hot gas generation rate. These principles may also apply to the system of the present invention. Since they are thoroughly discussed in application Ser. No. 608,152, these principles will not be repeated in this application. Rather, specific reference is made to the disclosure of application Ser. No. 608,152, and its contents are hereby incorporated into this application, by such specific reference.

Fluid mixing apparatus according to the present invention may include side wall means forming an elongated tubular chamber having at least one discharge opening extending laterally of the chamber through said side wall means. An axially slidable sleeve valve member may surround said wall means and include a first, closure end portion sized to snugly surround side wall means, an opposite, flow directing end portion of a transverse dimension larger than said side wall means, so as to define with said side wall means a space between the two, and an intermediate portion interconnecting the two end portions. The intermediate portion may have an internal piston surface extending somewhat laterally of the sleeve member. Retainer means may be provided for initially holding the sleeve valve member in a position wherein the closure end portion overlies and in that manner closes the discharge opening in the wall means. Owing to this arrangement, first a fluid introduced into the elongated tubular chamber cannot discharge therefrom through the discharge opening in the side wall means until the sleeve valve member has been moved to its open position. The apparatus may include passageway means for delivering a second fluid somewhat axially of the sleeve valve member, and against the piston surface, and under sufficient pressure so that the axial force it exerts against the piston surface is sufficient enough to move the sleeve valve member axially in opposition to the holding force of the retainer means. Stop means may be provided for arresting movement of the sleeve valve member after it has moved axially a sufficient distance to uncover the discharge opening in the side wall of the tubular chamber, and to place the discharge opening in communication with the annular space existing between the side wall means of the tubular chamber and the flow directing portion of the sleeve valve member. This permits the first fluid to flow into such annular space, then axially through such space towards and into the stream of the second fluid. Mixing contact of the two fluids occurs in what may be termed the inlet portion of a detaining and mixing chamber, the greater portion of which surrounds the tubular chamber. The two fluids are detained in such chamber until they are thoroughly mixed.

In the preferred form of cool gas generator of the present invention, the first fluid constitutes the effluent from a hot gas generator and the second fluid is a cold liquid from a storage chamber. The two fluids are detained in the chamber of a sufficient amount of time to enable the hot gases to provide the heat of vaporization for, and in that manner cause the vaporization of, substantially all of the cold liquid. Also, a portion of the hot gases is introduced into the storage chamber for the cold liquid to pressurize and force feed the liquid to and then through the passageway leading to the piston surface on the sleeve valve member.

These and other objects, features and advantages of the present invention will be apparent from the following description, appended claims and annexed drawings.

BRIEF DESCRIPTION OF THE DRAWING

Referring to the drawing wherein like reference characters designate like parts throughout the several views;

FIG. 1 is a schematic view of a cool gas generating system typifying the principles of the present invention and adapted to article inflation;

FIG. 2 is a longitudinal sectional view of a typical commercial embodiment of a cool gas generator constructed according to the present invention, with a constant section intermediate portion thereof broken away, such view showing the sleeve valve in its closed position and a closure plug in the passageway leading from the tubular manifold into the storage chamber for the cold fluid;

FIG. 3 is a fragmentary longitudinal sectional view in the sleeve valve region of FIG. 2, showing the closure plug removed and the sleeve valve member in its open position;

FIG. 4 is a longitudinal sectional view of a second form of cool gas generator constructed according to the present invention; and FIGS. 5 and 6 are sectional views taken along lines 5—5 and 6—6, respectively, of FIG. 2.

DETAILED DESCRIPTION

Referring to FIGS. 1–3 in greater detail, the system shown includes a hot gas generating chamber 10 including an outlet 12, and containing a solid fuel grain 14.

A suitable igniter 16 is provided for initiating combustion. It is shown to comprise a pyrotechnic device 17 of shell form which includes a percussion cap 19, a spring loaded firing pin 21, and a release pin 23.

The cold fluid, which may be a liquefied coolant L (e.g. a liquefield fluorinated hydrocarbon type gas such as Freon 22), is stored under pressure in a storage chamber 18. By way of typical and therefore nonlimitive example, it will be assumed in the further description of the system of FIGS. 1–3 that the cold fluid is a liquid L.

The outlet 12 of the hot gas generator 10 communicates with a tubular manifold 20. A first hot gas passageway means 22 leads from the tubular manifold 20 into the interior of storage chamber 18. A second hot gas passageway, shown in the form of a side wall port 24, extends generally radially outwardly through the annular side wall means 26 forming the tubular manifold 20. Initially, port 24 is closed by a sliding sleeve valve member 28 and passageway 22 is closed by a blowout plug 30, or a functionally equivalent closure member (e.g. a spring biased check valve).

Sleeve valve member 28 may include a first end portion 32, hereinafter termed the closure portion, which is sized to snugly surround and engage the wall means 26 of the tubular manifold 20; a flow directing opposite end portion 34 of larger diameter than the tubular wall 26; and an interconnecting portion 36 which serves the dual function of a piston and a flow deflector, as will hereinafter be described in greater detail.

A cold fluid pickup tube 38 extends from a location within chamber 18, spaced from the closure plug 30, to a delivery opening 40 leading into an annular chamber 44 formed by and between the intermediate portion of the sleeve valve member 28, including the conical wall section 36, and the portion of the insert 46 immediately surrounding the distributor port 40.

The wall 26 is shown provided with an annular groove on each side of the outlet port 24 for receiving O-rings 48, 50. A similar groove is formed in the hub portion 52 of the insert 46 on the side of opening 40 opposite O-ring 50 to receive a third O-ring 54. Sealing rings 48, 50 combine to seal against leakage of hot gases from chamber 20 through the clearance between wall 26 and the closure end portion 32 of the sleeve valve member 28. O-rings 50, 54 combine to seal against premature leakage of the fluid from within chamber 18.

The enlarged end portion 34 of the sleeve valve member 28 may be formed to include an annular flange 56. A spring member 58, shown clamped between an outer peripheral portion of the insert 46 and a radially inwardly directed radial flange 60 formed on tubular housing 62, includes inwardly projecting fingers 59 which initially rest and press against the flange 56 and retain sleeve valve member 28 in its closed position against a stop 63.

In operation, the fuel grain 14 is initiated by removing pin 21. This frees the compression spring enabling it to push firing pin 21 against cap 19. Cap 19 discharges the pyrotechnic device 17 and it in turn initiates combustion on all walls of the central opening in the grain 14. As combustion proceeds, the hot gases which are generated collect in the chamber 20 until the pressure buildup is sufficient to blow out the closure element 30. Then, the hot gases flow through the passageway 22 into the interior of the coolant storage chamber 18. Such hot gases pressurize the coolant L and cause it to enter pickup tube 38. The pressure of the fluid in passageway 40 directed against the conical piston surface of wall portion 36 tends to force the sleeve valve member 28 axially to the left, as pictured, in opposition to the force of the retaining spring 58. The force exerted by the fingers 59 of the retaining spring 58 is weaker than the force of the pressurized fluid. Accordingly, the fluid pressure force on sleeve valve member 28 overrides the force of the spring fingers 59. When this happens the fingers 59 bend and the flange 56 slides under and then pops over to the opposite side of the spring fingers 59, and the sleeve valve member 28 moves as a whole to the left until it contacts the end 64 of the hot gas generator chamber 10.

As shown by FIG. 3, when the sleeve valve member 28 is in its open position the hot gases are free to flow outwardly from manifold 20 through the radial port 24. The conical wall section 36 then diverts the flow axially to the right as pictured and the tubular wall section 34 directs it generally axially towards the distributor port 40. Owing to this arrangement, the hot gases from manifold chamber 20 and the cold fluid from storage chamber 18 flow into, or impinge on, each other as they meet. The partially combined fluids then flow radially outwardly into the retaining and mixing chamber 66 which is formed between annular walls 26 and 62 in the radial direction and radial walls 64 and 68 in the axial direction.

The outlet from the detaining and mixing chamber 66 may be in the form of an annular passageway 70, formed by and between tubular wall 62 and tubular wall 10, in surrounding relationship to hot gas generator wall 10. Thus the annular outlet passage 70 surrounds the hot gas generator, and it feeds into an outlet passageway 72 which leads to a utilization device, e.g. an inflatable escape slide (FIG. 1). The inlet I may include an aspirator A.

In the mixing chamber 66 the hot gases and the liquid coolant are mixed. There is a transfer of heat from the hot gases to the liquid, causing vaporization of the liquid, accompanied by a cooling of the hot gases.

Reference is now made to FIG. 4 which is a longitudinal sectional view of a modified form of cool gas generator embodying certain principles of the present invention. Such generator is shown to comprise an outer enclosure 74 of elongated tubular form. Located inside of it is a smaller inner tubular enclosure 76. As clearly shown, an annular space exists between the respective annular side walls of the two enclosures 74, 76 and additional space exists in outer enclosure 74 endwise of where the inner enclosure 76 terminates. This total space 78 constitutes a storage space for the cold liquid L.

The inner enclosure 76 is axially divided into a hot gas generator 80 and a combined fluid detaining and mixing chamber 82. In the illustrated embodiment the hot gas generator 80 is shown as containing a solid fuel grain 84, and including igniter means 86 which may be of the type described above in connection with the cool gas generator form shown by FIG. 2, and schematically by FIG. 1. The fuel grain 84 may be constructed according to any of the designs of fuel grains discussed in my aforementioned application. Ser. No. 608,152, with the particular construction depending upon the intended use of the system's effluent.

The hot gas generator 80 includes an outlet wall portion 88 which has a central outlet passageway 90 leading generally axially into an inner portion of the detaining and mixing chamber 82. It also includes a second outlet passageway terminating in one or more radial ports 92 which are initially closed by a check valve or closure member, shown in the form of an annular O-ring 94. The passageway which includes the port or ports 94 corresponds in function to passageway 22 in the cool gas generator of FIG. 2, passageway 90 corresponds to delivery port 24 and the annular passageway formed by and between wall portions 34, 36 of sleeve valve member 28 and side wall 26 of tubular chamber 20 corresponds to passageway 22, and O-ring 94 corresponds to blowout plug 30.

The wall means for the inner enclosure 76 includes a radial end wall 96 (which may be termed an inlet wall portion) spaced axially opposite the outlet wall 88. It includes a central inlet passageway 96 which opposes, and is generally coaxially related to, the passageway 90 in outlet wall 86 of the hot gas generator 80. A pickup tube 100 leads from a zone within the storage chamber 78 to the inlet passageway 98. The pickup tube 100 includes a fitting 102 at its outlet end adapted to screw into a centrally located, internally threaded socket portion 104 of the inlet wall 96. A frangible disk or blowout member 106 is initially clamped between the fitting 102 and a radial flange portion 108 of the inlet wall 96. Similarly, a screw-in-fitting 110 is provided in the outlet wall 88 of the hot gas generator 80, and a second frangible disk or blowout plug 112 is initially clamped between it and a radial flange portion 114 of the outlet wall 88.

In operation, combustion is initiated within hot gas generator chamber 80. The first hot gases which are evolved flow into the outlet passageway means which includes the port or ports 92, and when their pressure is sufficient they push aside or break the O-ring closure member 94. The closure disk 112 prevents flow into the detaining and mixing chamber 82. The hot gases entering the storage chamber 78 pressurizes the liquid therein and force feeds it through the pickup tube 100 towards the inlet passageway 98. The frangible disks 106, 112 are designed so that they will both fracture at approximately the same time. When this happens the hot gases flow into the detaining and mixing chamber 82 from one end and the cold liquid flows into such chamber from the opposite end. The two fluids flow directly into each other, in a counterflowing manner, thus hurrying their mixing.

The detaining and mixing chamber 82 is shown to be of compartmented form. It includes inner wall means 116 forming an inner entrance portion to the chamber. A second annular wall 118 concentrically surrounds and is spaced radially outwardly from wall 116, so as to define an annular compartment between the two walls 116, 118. In similar fashion, a third annular wall 120 concentrically surrounds and is radially spaced outwardly from the intermediate wall 18, so as to form a second annular compartment. The outer wall 120 is a portion of the inner enclosure 82. A series of radial outlet ports 122 are provided in the inner wall 116, closely adjacent the hot gas outlet 90. Similarly, a plurality of radial ports 124 are provided in the intermediate wall 118 at the opposite end of the detaining and mixing chamber 82, closely adjacent the inlet passageway 98. Owing to this arrangement, the fluids first flow outwardly from the inner compartment through the ports 122 into the intermediate compartment, then axially through such compartment to the opposite end thereof, and then radially outwardly through ports 124 into the outer compartment, wherein flow is again reversed. The tortuous path provided by this arrangement of the compartments in effect lengthens the detaining and mixing chamber 82, i.e. it provides it with an effective length somewhere between two and three times its actual length. This assures sufficient detention of the two fluids within the chamber 82 to permit their thorough mixing, and to permit a substantially vaporization of all of the liquid coolant.

In similar fashion to the embodiment of FIG. 2, the outlet passageway means from the detaining and mixing chamber 82 includes an annular passageway 126 which surrounds the hot gas generator 80, and which discharges into a tubular outlet passageway 128 which leads to the utilization device.

The cold liquid is preferably a liquefied fluorinated hydrocarbon refrigerant, such as Freon 22 or Carrene-500, for example. The substances have relatively low molecular weights, and undergo relatively large changes in volume from gas to liquid and from liquid to gas. Also, they are stable and have relatively low vapor pressures. As a result of the relatively low vapor pressure, during periods of storage, leakage of fluid is no great problem, and there is little likelihood of an explosion.

Having thus described the invention, it is clear that the objects stated have been obtained in a simple and practical manner. Although the cool gas generator of the present invention has been specifically disclosed as part of a system for generating an inflating gas, it is to be understood that it has general utility and may be used in other installations requiring a relatively low temperature working fluid. By way of example, it may be used for driving turbines, or for inflating lifting means adapted for raising sunken ships or other sunken objects. While particular embodiments of the generator have been shown and described, it is to be understood that changes may be made in the construction and the arrangement of various parts

What is claimed:

1. A cool gas generator comprising: a hot gas and cold liquid detaining and mixing chamber including an entrance portion;
 a hot gas generating chamber including an outlet leading into the entrance portion of said detaining and mixing chamber;
 a storage chamber containing a pressure liquefied gas, said chamber including passageway means for delivering said liquefied gas into substantially counterflow impinging contact with the stream of hot gases within the entrance portion of the detaining and mixing chamber; and
 outlet passageway means for the combined fluids leading out from the detaining and mixing chamber.

2. A cool gas generator according to claim 1, wherein said mixing chamber is compartmented and includes wall means defining an inner compartment constituting the said entrance portion of the chamber, into which the hot gases and the cold liquefied gas enter from generally opposite directions, and wall means defining at least one auxiliary compartment surrounding the inner compartment, with the wall means defining the inner compartment including transverse outlet port means leading therefrom into the said surrounding auxiliary compartment, and with said auxiliary compartment including outlet means spaced axially of the mixing chamber from said outlet port means, whereby a tortuous path for the fluid exists from said inner compartment to said outlet means.

3. A cool gas generator according to claim 1, wherein said outlet passageway means at least partially surrounds at least a portion of the hot gas generating chamber.

4. A cool gas generator comprising: a tubular manifold having transverse discharge port means; a hot gas generating chamber including an outlet leading into said tubular manifold; a storage chamber containing a cold fluid; passageway means for delivering hot gases into said storage chamber to pressurize the fluid therein; an axially movable sleeve valve member surrounding said tubular manifold and including a closure portion normally closing the said transverse discharge port means, and a piston surface at one end of said closure portion; passageway means for delivering cold fluid from said storage chamber towards said piston surface, with the force of the pressurized cold fluid acting on said piston surface being sufficient to move the sleeve valve axially an amount sufficient to cause an uncovering of the discharge port means; and a combined fluid detaining and mixing chamber positioned to receive both the hot gases discharging from the tubular manifold and the cold fluid flowing from said storage chamber.

5. A cool gas generator according to claim 4, wherein the hot gas passageway leading into the storage chamber comprises closure means openable by the pressure of the hot gases.

6. A cool gas generator according to claim 4, comprising retainer means for initially exerting a retaining force on the sleeve valve, for holding it in a closed position until such force is overcome by the force of the pressurized fluid acting on said piston surface.

7. A cool gas generator according to claim 4, wherein said retainer means is a leaf spring element having at least one leaf extending generally perpendicularly to the direction of sleeve movement, and initially being in the path of movement of a portion of said sleeve, and being bendable to move and permit sleeve movement when a predetermined axial force is exerted on the sleeve by the pressurized fluid.

8. Fluid mixing apparatus comprising side wall means forming an elongated tubular chamber having at least one discharge opening extending laterally of the chamber through said side wall means; means for delivering a first fluid into said tubular chamber; an axially slidable sleeve valve member surrounding said wall means and having a first, closure end portion sized to snugly surround said side wall means, an opposite, flow directing end portion of a transverse dimension larger than said side wall means, so as to define with said wall means a space between the two, and an intermediate portion interconnecting said end portion, said intermediate portion having an internal piston surface extending somewhat laterally of the sleeve member; retainer means for initially holding the sleeve valve member in a position wherein said closure end portion overlies and in that manner closes off the discharge opening in said wall means; passageway means for delivering a second fluid somewhat axially of the sleeve valve member and against said piston surface; delivery means for delivering said second fluid to said passageway under sufficient pressure that such fluid pressing against the piston surface exerts sufficient force in the axial direction on the sleeve valve member to move it axially; and stop means for arresting movement of said sleeve valve member after it has moved axially a sufficient distance to uncover the discharge port means and place the flow directing end portion of the sleeve valve member generally laterally outwardly from said discharge opening, whereby it directs the flow of the first fluid discharging from the discharge opening generally axially of the wall means and into direct counterflow contact with the second fluid flowing through said passageway means.

9. Apparatus according to claim 8, wherein said second fluid is a liquid, said apparatus includes a storage chamber for said liquid, said first fluid is a pressure gas, and said apparatus includes means for directing a portion of said first fluid into said storage chamber for pressurizing the liquid therein and pressure feeding it through said delivery means to said passageway means.

10. Apparatus according to claim 8, wherein said piston surface slopes axially in its extent outwardly from the closure end portion to the flow directing end portion, and said stop means arrests the sleeve valve member in a position wherein at least a portion of said piston means is located directly outwardly from the discharge port means, so that said sloped piston surface can function to divert flow of the first fluid generally axially.

11. Apparatus according to claim 8, wherein said sleeve valve member includes abutment means projecting laterally outwardly from said side wall means, and said retainer means comprises at least one leaf spring element anchored outwardly of said abutment and projecting inwardly generally perpendicularly to the direction of sleeve member movement, each said spring element having a free end portion pressing against the abutment on the closure end portion side thereof, and being stiff enough to resist axial movement of the sleeve valve member until the pressurized second fluid is delivered against the piston surface, but flexible enough to then bend and permit the projection to move under it and the sleeve valve member to move axially to an open position.

12. A cool gas generator comprising: outer wall means forming an outer enclosure; inner wall means forming an inner enclosure within said outer enclosure, and having an inlet wall portion, with a cold fluid storage space being formed by and between said outer and inner wall means; a cold fluid in said space; cold fluid inlet means in said inlet wall portion, for delivering cold fluid from said storage space into the inner enclosure; a hot gas generator contained within said inner enclosure, and having an outlet wall portion spaced inwardly in said inner enclosure from said inlet wall portion; a detaining and mixing chamber located generally between the outlet wall portion of the hot gas generator chamber and the inlet wall portion of the inner wall means; fluid delivery means for directing the hot gases from the hot gas generator through said outlet wall means and then into the detaining and mixing chamber, and in counterflowing mixing contact with the cold fluid entering into the inner enclosure through the cold fluid inlet means; and a combined fluid outlet passageway means leading outwardly of the cool gas generator from the detaining and mixing chamber.

13. A cool gas generator according to claim 12, wherein said combined fluid outlet passageway means at least partially surrounds at least a portion of the hot gas generator.

14. A cool gas generator according to claim 12, wherein said cold fluid is a liquid while in said storage space.

15. A cool gas generator according to claim 12, wherein said mixing chamber is compartmented and includes an inner compartment into which the hot gases and the cold fluid enter, and at least one auxiliary compartment surrounding the inner compartment, with the inner compartment including transverse outlet port means leading therefrom into the said surrounding auxiliary compartment, and with said auxiliary compartment including outlet means spaced axially of the mixing chamber from said outlet port means, so as to form a tortuous path for the fluid from said inner compartment to said outlet means.

16. A cool gas generator according to claim 12, wherein said fluid delivery means includes a tubular manifold in hot gas receiving communication with the hot ags generator, and said manifold includes a transverse discharge port means, wherein said detaining and mixing chamber surrounds said tubular manifold, and wherein said gas generator further includes an axially movable sleeve valve member surrounding said tubular manifold, said member including a closure portion normally closing the said transverse discharge port means, and a piston surface at one end of said closure portion, in the path of the cold fluid, with the force of said cold fluid acting on said piston surface being sufficient to move the sleeve valve axially an amount sufficient to cause an uncovering of the discharge port means.

17. A gas generator comprising:
an outer casing having an opening therein;
a smaller inner casing insertable into said outer casing through said opening,
with a storage space for a liquid existing about the inner casing, between it and the outer casing,
with said inner casing housing a combustion chamber and a communicating mixing chamber; and
means for delivering gases of combustion from said combustion chamber and liquid from said storage space into said mixing chamber for admixture therein, and
with the inner casing including mixed fluid exhaust passageway means extending from said mixing chamber outwardly to the end of said inner casing which is adjacent the opening in the outer casing through which the inner casing is inserted.

18. The method of rapidly vaporizing a liquid to produce a gaseous fluid, said method comprising:
generating hot gases under pressure;
delivering a portion of said hot gases into a storage chamber containing a body of a liquid, to pressurize said liquid and force feed it into a separate mixing chamber;
delivering at least a portion of the remainder of said hot gases into counterflowing impinging contact with the liquid entering the mixing zone;
delaying said hot gases and said liquid in the mixing zone a sufficient time to allow the said hot gases to provide the heat of vaporization for, and cause the vaporization of, at least most of the liquid;
forming the resulting mixture into a stream; and
delivering said stream to a utilization device.

19. The method of claim 18, wherein said liquid comprises liquefied fluorinated hydrocarbon type gas.

References Cited

UNITED STATES PATENTS

| | | | |
|---|---|---|---|
| 2,406,178 | 8/1946 | Walley | 137—540 |
| 3,163,014 | 12/1964 | Wismar | 62—48 |
| 3,182,554 | 5/1965 | Barakuskas | 89—1.81 |
| 3,298,278 | 1/1967 | Barakuskas | 89—1.8 |

LLOYD L. KING, *Primary Examiner.*

U.S. Cl. X.R.

60—39.48